United States Patent [19]
Scheidt et al.

[11] Patent Number: 5,432,851
[45] Date of Patent: Jul. 11, 1995

[54] PERSONAL COMPUTER ACCESS CONTROL SYSTEM

[75] Inventors: Edward M. Scheidt, McLean; Charles E. McCullough, Woodbridge, both of Va.; C. Jay Wack, Clarksburg, Md.

[73] Assignee: TECSEC Incorporated, Vienna, Va.

[21] Appl. No.: 139,136

[22] Filed: Oct. 21, 1993

[51] Int. Cl.⁶ .............................................. H04K 1/00
[52] U.S. Cl. ........................................ 380/25; 380/23; 380/4
[58] Field of Search ...................... 380/3, 4, 23, 24, 25

[56] References Cited

U.S. PATENT DOCUMENTS

| | | | |
|---|---|---|---|
| 4,599,489 | 7/1986 | Cargile | 178/22.08 |
| 4,890,323 | 12/1989 | Beker et al. | 380/25 |
| 4,910,775 | 3/1990 | Audebert et al. | 380/25 |
| 5,060,263 | 10/1991 | Bosen et al. | 380/25 |
| 5,136,644 | 8/1992 | Audebert et al. | 380/25 |
| 5,323,465 | 6/1994 | Avarne | 380/23 |

*Primary Examiner*—David C. Cain
*Attorney, Agent, or Firm*—Jon L. Roberts; Thomas M. Champagne; Roberts & Associates

[57] ABSTRACT

An access control system which uses a password token scheme for controlling user access to data within computer systems. The key component in the access control system is an optical token card that is capable of receiving optically encoded information directly from the CRT display of a standard personal computer and processing the information for use in identification and authentication procedures, cryptographic key management schemes, and administrative procedures such as maintaining audit trails. This design permits the use of much longer strings of challenge input data without the addition of peripheral readers to the system.

27 Claims, 1 Drawing Sheet

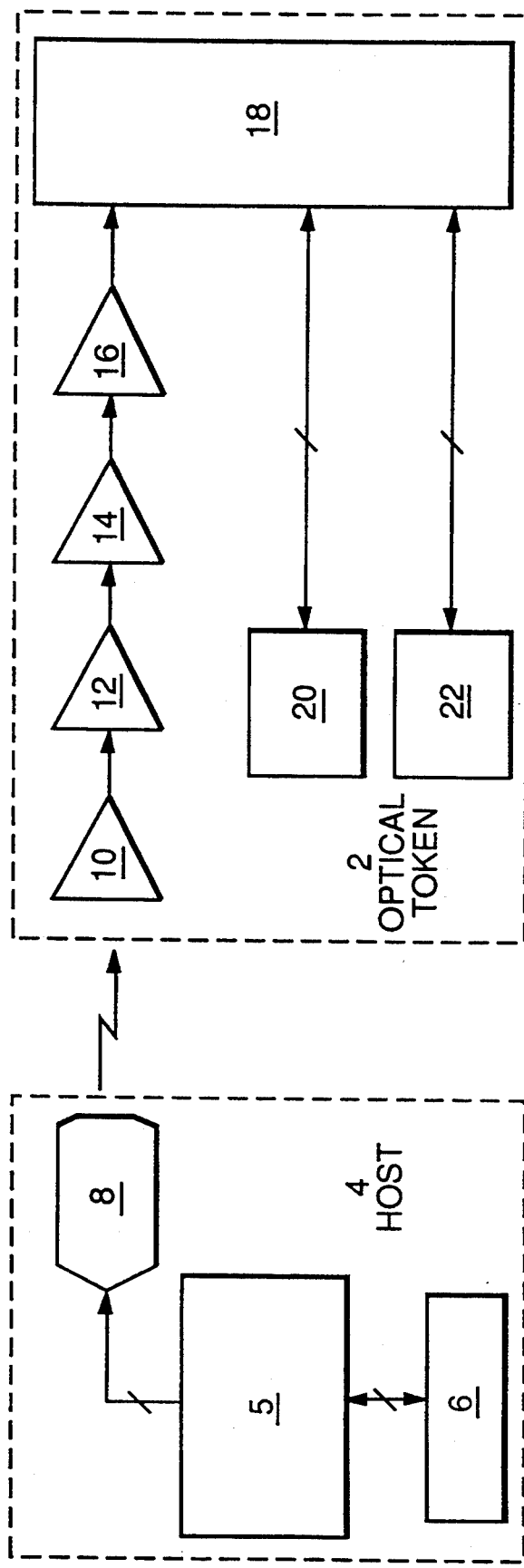

PERSONAL COMPUTER ACCESS CONTROL SYSTEM

FIELD OF THE INVENTION

The present invention relates generally to a system for controlling user access to a computer system. In particular, the present invention is system that includes a device that optically reads an access challenge from a computer display and performs a cryptographic manipulation on the challenge sequence in order to provide a password for the user. The device may also be used to provide cryptographic keys for encrypting and decrypting particular files resident on the computer system.

BACKGROUND OF THE INVENTION

Computer security is dependent upon controlling user access to data within computer systems. To provide such control, the system must incorporate security measures, known as identification and authentication (I&A) mechanisms, to reliably authenticate user identity. One of the basic types of I&A mechanisms is called authentication by ownership. Password tokens, that is, hand held electronic devices, such as smart cards, that generate session-unique passwords, are an example of an authentication by ownership type I&A mechanism. One effective password token scheme calls for the host computer, at user log-in, to generate and display a message known as a challenge. The user manually keys the challenge into the token. The token processes the input challenge, using a cryptographic process, and generates and displays a session-unique password (known as a response) to be manually keyed into the host by the user. Upon correct response input, the user is granted access by the host security system.

For example, U.S. Pat. No. 4,890,323 to Beker et al. discloses a method of secure message transmission from a terminal apparatus to a remote receiving station in a communications system which involves appending an authentication code to a transmitted message. The authentication code is dependent upon the contents of the associated message and contains information representing the identity of the sender of the message. The authentication code is generated based on a cryptographic key, but the transmitted message itself is not encrypted. The information representing the identity of the sender is located in a token assigned to a particular user. The token can only be accessed upon entering a correct personal identification number. The user reads a sequence of numbers representing a first part of the authentication code on the terminal display and enters this sequence of numbers into the token. The token responds with a second sequence of numbers, which the user keys into the terminal apparatus. The first and second sequences of numbers are combined within the terminal apparatus to form the authentication code.

The main disadvantage of this and other existing challenge-response tokens is their manually keyed challenge data input scheme. This cumbersome scheme necessarily limits the amount of input data keyed into the token to short manageable strings. The inputting of long cryptographic variables and remote token programming (such as performing administrative updates) are unmanageable tasks.

U.S. Pat. No. 5,060,263 to Bosen et al. discloses an electronic access control system for a computer utilizing a password issuing device. An access control program resident in the computer generates a challenge to the user, and the user responds by using the challenge value to generate a password that is an encrypted version of the previous password. The challenge is displayed on the screen of the computer terminal. The user enters the challenge value into the password issuing device using a keyboard. The password issuing device displays the new password, which the user enters into the computer using the computer keyboard. If the entered password is validated by the computer, the user is allowed access to the system. No encryption of data resident in the computer is disclosed. The challenge length is kept to a minimum in this system by having each digit of the challenge represent an encryption algorithm resident in the password issuing device, so that multiple levels of password encryption can occur as a result of a challenge of a few digits. However, the resulting password must still be kept to a minimum length in order to be entered into the computer.

Some security system designers have specified the use of expensive peripheral token readers to overcome the problem of entering lengthy challenges.

For example, U.S. Pat. No. 4,910,775 and U.S. Pat. No. 5,136,644, both to Audebert et al. disclose a portable electronic device that can be used to authorize access to a data processing system via a terminal. The data processing system displays data on the terminal which may be keyed into the electronic device, or which the electronic device may read using phototransistors located on one edge surface of the device. The electronic device displays a code in response to the input data, and the user keys this code into the data processing system, which will then allow or deny access to the system based on the code. No data is encrypted. A user must perform an identification function prior to operating the electronic device. The devices are only contemplated for use in optically reading data from the terminal display when data is kept to a minimum. When longer data strings are used, a peripheral device is used in order for the electronic device to read the data.

Access control systems currently in use function as password schemes to allow or deny access to a computer, but do not utilize the cryptographic capabilities of the system to encrypt and decrypt files stored on the computer.

U.S. Pat. No. 4,599,489 to Cargile discloses a semiconductor device that functions to control access to a software program resident in a computer. The device generates a password that depends on a real time signal. The user reads the password, which is displayed on the key device, and enters the password into the computer. A stimulus number may be generated by the computer and provided to the key to initiate the password generation process. The stimulus number may be transmitted to the key by selectively exciting portions of the computer display, the patterns of which are read by photosensors on the key. The Cargile patent discloses a system for providing password protection for software programs, but the disclosed system does not perform any encryption or decryption function. The fact that the generated password is based on the real time of day signal instead of a random signal makes the system too easily corruptible.

SUMMARY OF THE INVENTION

It is therefore an object of the present invention to provide an access control system for personal computers that generates a password based on a challenge sequence.

It is a further object of the present invention to provide an access control system for personal computers that allows the use of long challenge sequence strings.

It is an additional object of the present invention to provide an access control system for personal computers that does not require any peripheral devices for use with the personal computer.

It is another object of the present invention to provide an access control system for personal computers that allows for remote token programming.

It is also an object of the present invention to provide an access control system for personal computers that can be used to encrypt and decrypt individual files stored on the personal computer.

These and other objects and advantages of the present invention will be apparent to those of ordinary skill in the art upon inspection of the detailed description, drawings, and appended claims.

The access control system uses a password token scheme for controlling user access to data within computer systems or any data processing means. The key component in the access control system is an optical token card that is capable of receiving optically encoded information directly from the CRT display of a standard personal computer and processing the information for use in identification and authentication procedures, cryptographic key management schemes, and administrative procedures such as audit trails maintenance. This design permits the use of much longer strings of challenge input data without the addition of peripheral readers to the system. A typical procedure for use of the optical token is as follows:

(1) The user enters his personal identification number (PIN) or password into the host system.
(2) The user is prompted by the host system to place his optical token over a pattern on the host CRT screen.
(3) Challenge information, in the form of encoded light, is optically coupled from the host CRT screen to an opto-electronic detector on the token.
(4) Using a cryptographic algorithm, the token generates a response (the session-unique password) based on the challenge. The response is then displayed on the LCD readout of the optical token or is transferred to the PC by other means.
(5) The user manually enters the response information on the keyboard of the host system. If correct, the user is granted access to the host system. (This step may be modified to accommodate other data transfer mechanisms.) Otherwise, access is denied.

BRIEF DESCRIPTION OF THE DRAWINGS

FIG. 1 shows a system block diagram, including the host system and the optical token.

DETAILED DESCRIPTION

Referring to FIG. 1, the system block diagram is described. The optical token 2 is used in conjunction with a host system 4. The host system includes a computer 5, a keyboard 6 or other input means, and a display 8, most likely of the CRT type, although any type of visual display means is contemplated for use with the optical token 2. The computer 5 is preferably a personal computer but may be any device having data processing capability for which limited access is desired. The computer 5 may also include memory means for storing files. The optical token includes a front-end circuit, logic means, preferably in the form of a microcontroller 18, an LCD display 20, and external memory 22.

The front-end circuit of the optical token is the token input means and includes an opto-electronic detector 10 or other optical detection means, amplification and filtering stage 12, a comparator 14, and a monostable multivibrator integrated circuit (IC) 16. The front-end circuit receives the challenge signal generated by the host system 4 by detecting light from the host display and generating a digital logic level output. For example, areas where the display is generating light can result in a high logic level output from the front-end stage, and areas where the display is not generating light can result in a low logic level output from the front-end stage. The opposite can also be true, depending on the specific design of the system and the front-end circuit components used.

In the preferred embodiment, the front-end circuit will be designed to make the token compatible with all raster-type CRT displays, including 2:1 interlaced and non-interlaced types and CGA through SVGA and NTSC standards, and will operate with a wide range of CRT brightness and contrast settings.

The opto-electronic detector 10 is a visible wavelength detector that senses light from the display and generates a proportional analog voltage. In this way, the token can receive the challenge signal presented on the host system display 8. Such detectors are well known in the art and are readily available.

The amplification and filtering stage 12 is connected to the output of the opto-electronic detector 10. This stage provides conditioning for the detector analog output signal, smoothing the signal and providing the necessary amplitude for the comparator 14 input.

The comparator 14 is connected to the output of the amplification and filtering stage 12. The comparator 14 accepts the conditioned analog signal from the amplification and filtering stage 12 and converts it to a standard digital logic level. In the preferred embodiment, the comparator 14 is a schmitt trigger.

The monostable multivibrator IC 16 is connected to the output of the comparator 14. The multivibrator accepts the output signal from the comparator 14 and triggers on the rising edge of this output, providing a fixed interval pulse for the microcontroller 18.

The microcontroller 18 is connected to the output of the multivibrator IC 16 and accepts input data from the optical front-end circuit. The microcontroller 18 processes this input data according to a cryptographic algorithm to generate the session-unique passwords required by the host system 4 in response to the challenge signal. The microprocessor 18 also provides input and output (I/O) functions for the LCD display 20 and external memory 22 and can also be used to perform a variety of record keeping and cryptographic key management functions.

The LCD display 20 is connected to an output bus of the microcontroller 18 and provides the user with visual information from the token microcontroller. Other display means are contemplated for use with the present invention as well, the LCD display being the preferred means.

The external memory 22 is connected to the microcontroller 18 by a bidirectional bus. The external memory 22 is used to store information used by the microcontroller 18 to generate the password. Cryptographic key information such as a cryptographic algorithm, or any other data may also be stored in the external memory 22. Alternatively, the microcontroller 18 may have internal memory or any other type of memory means to be used instead of or in addition to the external memory 22.

The host system 4 will generate and display a challenge presented as an output signal on the display 8 when a user attempts access to the system. The challenge signal is generated by challenge means, preferably in the form of a signal generator with associated control circuitry, located within the host system computer 5. The host system 4 at this time may also prompt the user to hold the token 2 up to the host system display 8. The user then holds the optical token 2 over the challenge in such a way that the opto-electronic detector 10 can read the challenge. The challenge is then converted and conditioned by the front end circuit of the token 2 and presented to the microcontroller 18. The microcontroller 18 manipulates the challenge according to an algorithm stored in external memory 22 and generates a password for the session. The password is provided to the token display 20 so that it can be read by the user. The user then keys the password into the host system 4 using the host system keyboard 6 or other available input means. If the password is correct, the user is allowed access to the host system 4.

Password evaluation and verification is performed by verification means circuitry, software, or firmware within the host system 4. Such evaluation and verification may involve, for example, the generation of the session-unique password within the host system. This password is then compared to the password keyed in by the user, a favorable comparison resulting in acceptance of the token password by the verification means and an unfavorable comparison resulting in nonacceptance of the token password by the verification means. Access control means circuitry, software, or firmware within the host system 4 will then either allow the user access to the host system 4 or will deny the user access to the host system 4, depending on the acceptance status of the password by the verification means.

The present invention may also be used to control access to specific software programs or files stored in memory on the host system 4. For example, a user attempting to run an application program on the host system 4 may be prompted by the host system 4 to read an on-screen challenge with the optical token 2. Having done this, the user will be required to provide a token generated password before he will be allowed to run the application.

Similarly, the present invention may be used to encrypt and decrypt files stored on the host system 4 or received by the host system 4 as a communication from another system on a network. When a user accesses a file on the host system 4, the file may be encrypted and therefore unreadable to the user. In order to decrypt the file, that is, convert the file to plain text, the user must furnish a key to the host system 4. The host system may display a challenge signal which is actually lengthy cryptographic key seed, which the user will read with the optical token 2. This seed will be manipulated by the optical token microcontroller 18 in order to generate a password which is actually the key, which is displayed on the token 2 and keyed into the host system 4 by the user. The key will then be applied to the encrypted file according to a host system resident algorithm, decrypting the file.

Encryption of a file may take place in a similar manner, with the key being used by the host system 4 to encrypt a file according to an encryption algorithm resident on the host system 4.

Encryption and decryption of files will be subject to the same password verification as the host system access. The means for performing encryption and decryption of the files within the host system is connected to the verification means. If the verification means accepts the password (key), the encryption/decryption means will allow encryption and decryption of files stored in the host system memory. If the password (key) is not accepted, encryption and decryption will not be allowed.

In the above encryption/decryption scenario, a portion of the seed may be interpreted by the microcontroller 18 in the optical token 2 as a control command to choose from among a number of keys stored on the optical token 2. In this way, different files may be encrypted and decrypted using different keys. Also, the host system may provide the token 2 with new cryptographic information. Signals read by the token 2 may instruct the microcontroller 18 to erase old cryptographic information from the external memory 22 and/or to write new cryptographic information into the memory 22.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. An access control system for a data processor, comprising:
    A) a challenge generator within the data processor adapted to generate a session-unique challenge signal;
    B) a token, separate from the data processor, the token comprising a token input port disposed to receive the challenge signal and the token further comprising conversion logic disposed to generate a session-unique password in response to the challenge signal;
    C) an input device within the data processor disposed to receive the password;
    D) verification logic within the data processor disposed to verify the password generated by the token; and
    E) access control logic within the data processor disposed to allow a user access to the data processor only if the password generated by the token is positively verified by the verification logic.

2. The access control system of claim 1, wherein the data processor further comprises memory adapted to store computer applications and files and wherein the access control logic is disposed to allow a user access to one of said computer applications only if the password generated by the token is positively verified by the verification logic.

3. The access control system of claim 2, wherein the data processor further comprises memory adapted to store computer applications and files and wherein the access control logic is disposed to allow a user access to one of said files only if the password generated by the token is positively verified by the verification logic.

4. The access control system of claim 3, further comprising encryption/decryption logic disposed to encrypt and decrypt files stored in the memory if the password generated by the token is positively verified by the verification logic.

5. The access control system of claim 1, wherein:
A) the data processor further comprises a display disposed to present output signals, including the challenge signal, generated by the data processor; and
B) the token input port comprises an optical detector disposed to receive the challenge signal presented on the display.

6. The access control system of claim 4, wherein:
A) the token further comprises token memory disposed to store data including a cryptographic algorithm;
B) the conversion logic comprises a microprocessor disposed to generate the password in response to the challenge signal according to the cryptographic algorithm; and
C) the token further comprises a token display disposed to present the password to the user.

7. The access control system of claim 1, wherein the input device comprises a keyboard.

8. A method for controlling access to a data processing system which stores computer applications and files, comprising:
A) generating a session-unique challenge signal in the data processing system;
B) presenting the challenge signal in optical form;
C) optically reading the challenge signal;
D) processing the challenge signal according to an encryption algorithm;
E) generating a session-unique password from the processed challenge signal;
F) providing the password to the data processing system;
G) verifying the password within the data processing system;
H) allowing a user access to the data processing system if the password is positively verified; and
I) denying a user access to the data processing system if the password is not positively verified.

9. The method of claim 8, further comprising allowing a user access to one of said computer applications only if the password is positively verified.

10. The method of claim 8, further comprising allowing a user access to one of said files only if the password is positively verified.

11. The method of claim 8, further comprising encrypting a plain text file stored in the data processing system using the password, if the password is positively verified.

12. The method of claim 8, further comprising decrypting an encrypted file stored in the data processing system using the password, if the password is positively verified.

13. An access control system for a data processor, comprising:
A) a challenge generator within the data processor adapted to generate a session-unique challenge signal;
B) a token, separate from the data processor, the token comprising a token input port disposed to receive the challenge signal generated by the data processor and the token further comprising a conversion subsystem disposed to generate a session-unique password in response to the challenge signal;
C) an input device within the data processor disposed to receive the password; and
D) a verification subsystem within the data processor disposed to verify the password generated by the token;
E) the data processor further comprising memory adapted to store computer applications and files, and an encryption/decryption subsystem disposed to encrypt and decrypt files stored in the memory if the password generated by the token is positively verified by the verification subsystem.

14. The access control system of claim 13, further comprising an access control subsystem within the data processor disposed to allow a user access to the data processor only if the password generated by the token is positively verified by the verification subsystem.

15. The access control system of claim 14, further comprising an access control subsystem within the data processor disposed to allow a user access to one of said computer applications only if the password generated by the token is positively verified by the verification subsystem.

16. The access control system of claim 14, further comprising an access control subsystem within the data processor disposed to allow a user access to one of said files only if the password generated by the token is positively verified by the verification subsystem.

17. The access control system of claim 13, wherein:
A) the data processor further comprises a display disposed to present output signals, including the challenge signal, generated by the data processor; and
B) the token input port comprises an optical detector disposed to receive the challenge signal presented on the display.

18. The access control system of claim 13, wherein:
A) the token further comprises token memory connected to the conversion subsystem and adapted to store data including a cryptographic algorithm;
B) the conversion subsystem comprises a microprocessor adapted to generate a password in response to the challenge signal according to the cryptographic algorithm; and
C) the token further comprises a token display connected to the microprocessor and adapted to present the password to the user.

19. The access control system of claim 13, wherein the input device comprises a keyboard.

20. An access control system for a data processor having memory adapted to store computer applications and files, comprising:
A) a challenge generator within the data processor adapted to generate a session-unique challenge signal;
B) a token, separate from the data processor, the token comprising a token input port disposed to receive the challenge signal generated by the data processor and the token further comprising a conversion subsystem disposed to generate a session-unique password in response to the challenge signal;
C) an input device within the data processor disposed to receive the password;

D) a verification subsystem within the data processor disposed to verify the password generated by the token; and E) an access control subsystem within the data processor disposed to allow a user access to one of said computer applications only if the password generated by the token is positively verified by the verification subsystem.

21. The access control system of claim 20, further comprising an access control subsystem within the data processor disposed to allow a user access to the data processor only if the password generated by the token is positively verified by the verification subsystem.

22. The access control system of claim 20, further comprising an access control subsystem within the data processor disposed to allow a user access to one of said files only if the password generated by the token is positively verified by the verification subsystem.

23. The access control system of claim 20, further comprising an encryption/decryption subsystem disposed in the data processor to encrypt and decrypt files stored in the memory if the password generated by the token is positively verified by the verification subsystem.

24. An access control system for a data processor having memory adapted to store computer applications and files, comprising:

A) a challenge generator within the data processor adapted to generate a session-unique challenge signal;

B) a token, separate from the data processor, the token comprising a token input port disposed to receive the challenge signal generated by the data processor and the token further comprising a conversion subsystem disposed to generate a session-unique password in response to the challenge signal;

C) an input device within the data processor disposed to receive the password;

D) a verification subsystem within the data processor disposed to verify the password generated by the token; and E) an access control subsystem within the data processor disposed to allow a user access to one of said files only if the password generated by the token is positively verified by the verification subsystem.

25. The access control system of claim 24, further comprising an access control subsystem within the data processor disposed to allow a user access to the data processor only if the password generated by the token is positively verified by the verification subsystem.

26. The access control system of claim 24, further comprising an encryption/decryption subsystem disposed in the data processor to encrypt and decrypt files stored in the memory if the password generated by the token is positively verified by the verification subsystem.

27. The access control system of claim 26, further comprising an access control subsystem within the data processor disposed to allow a user access to one of said computer applications only if the password generated by the token is positively verified by the verification subsystem.

* * * * *